United States Patent
Lee et al.

(10) Patent No.: US 7,567,401 B2
(45) Date of Patent: Jul. 28, 2009

(54) METHOD AND APPARATUS FOR CONTROLLING MOTOR ROTATION IN HARD DISK DRIVE

(75) Inventors: Hong-kwon Lee, Seongnam-si (KR); Sang-chul Shin, Osan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 187 days.

(21) Appl. No.: 11/518,249

(22) Filed: Sep. 11, 2006

(65) Prior Publication Data

US 2007/0070539 A1 Mar. 29, 2007

(30) Foreign Application Priority Data

Sep. 24, 2005 (KR) .................. 10-2005-0089029

(51) Int. Cl.
*G11B 15/46* (2006.01)
(52) U.S. Cl. .................. 360/73.03; 318/400.12; 318/430
(58) Field of Classification Search .................. None
See application file for complete search history.

(56) References Cited

U.S. PATENT DOCUMENTS 6,078,158 A * 6/2000 Heeren et al. ............... 318/430
6,400,522 B1 * 6/2002 Milligan ....................... 360/69
6,633,450 B1 10/2003 Kaneko ..................... 360/73.03
7,009,354 B2 * 3/2006 Tanner ......................... 318/471
2003/0103289 A1 * 6/2003 Sakamoto ..................... 360/70

FOREIGN PATENT DOCUMENTS

JP 2004-15893 1/2004
JP 2005-44505 2/2005

* cited by examiner

*Primary Examiner*—Andrew L Sniezek
(74) *Attorney, Agent, or Firm*—Staas & Halsey LLP (57) ABSTRACT

A method and apparatus for controlling a rotation of a motor in a disk drive. The method includes: performing spin-up when the disk drive is operating and determining whether a disk rotation speed is less than predetermined target constant revolutions per minute (RPM); rotating a disk at predetermined low RPM when determining that the disk drive is at a low temperature and changing a rotation mode to a low-speed rotation mode if it is determined that the disk rotation speed is less than the predetermined target constant RPM; and spinning up the disk to the target constant RPM when determining that the temperature of the disk drive has increased and changing the rotation mode to a high-speed rotation mode if a disk rotation driving current decreases below a predetermined reference current value while the disk is rotating at the low RPM. Accordingly, since spin-up can be normally performed through a step-by-step spin-up process even if a disk drive operates at a very low temperature, a normal operation and reliability of the disk drive can be guaranteed, and an excessive driving current for the normal operation of the disk drive is not required at the very low temperature.

16 Claims, 7 Drawing Sheets

METHOD AND APPARATUS FOR CONTROLLING MOTOR ROTATION IN HARD DISK DRIVE

CROSS-REFERENCE TO RELATED APPLICATION

This application claims the benefit of Korean Patent Application No. 10-2005-0089029, filed on Sep. 24, 2005, in the Korean Intellectual Property Office, the disclosure of which is incorporated herein by reference.

BACKGROUND OF THE INVENTION

1. Field of the Invention

The present invention relates to a hard disk drive (HDD), and more particularly, to a method and apparatus for controlling the rotation of a motor in an HDD.

2. Description of Related Art

Hard disk drives (HDDs) of various types are used in various mobile devices such as car navigation systems, car personal computers (PCs), portable media players (PMPs), portable media centers (PMCs), and cell phones.

The HDD has a spindle motor which rotates a disk at a constant angular velocity. Thus, a head of the HDD is raised above the disk by a dynamic pressure due to the rotation of the disk in order to perform magnetic recording/reading on/from the surface of the rotating disk. Recently, a fluid dynamic bearing (FDB) has been used in the spindle motor to reduce noise and vibrations, and increase the performance and reliability of the HDD.

The viscosity of the FDB rapidly increases when the temperature decreases, thereby significantly decreasing a bearing capacity due to viscous friction. Thus, below a specific low temperature, the spindle motor cannot spin-up a disk up to a target rotation speed set when the HDD was designed.

In particular, a mobile device using such HDD may be used at temperatures between −30° C. and 80° C. In general, since a viscous friction of a fluid bearing rapidly increases at a very low temperature of −30° C., a torque constant of the spindle motor must be set to a low value in order to rotate the spindle motor up to the rated rotation speed. As a result, the HDD requires a high driving current, which increases power consumption.

Thus, according to a conventional method and apparatus for controlling the rotation of a motor in an HDD, since the rotation of the motor cannot be increased at a very low temperature, a normal operation of the HDD cannot be performed, thereby decreasing reliability of a device using the HDD. In addition, for a normal operation of the device, an excessive driving current is required.

BRIEF SUMMARY

An aspect of the present invention provides a method of controlling a rotation of a motor in a disk drive so that the disk drive can operate at a very low temperature with low revolutions per minute (RPM) by a simple process and spin up a disk to the rated RPM when the temperature increases due to various factors such as heat generated during an operation thereof.

An aspect of the present invention also provides an apparatus for controlling a rotation of a motor in a disk drive using the above method.

According to an aspect of the present invention, there is provided a method of controlling a rotation of a motor in a disk drive, the method including: performing spin-up when the disk drive is operating and determining whether the disk rotation speed is less than a predetermined target constant RPM; rotating the disk at predetermined low RPM if it is determined that the disk drive operates at a low temperature and changing a rotation mode to a low-speed rotation mode if it is determined that the disk rotation speed is less than the predetermined target constant RPM; and spinning up the disk to the target constant RPM when it is determined that the temperature of the disk drive has increased and changing the rotation mode to a high-speed rotation mode if a disk rotation driving current decreases below a predetermined reference current value while the disk is rotating at the low RPM.

According to another aspect of the present invention, there is provided an apparatus for controlling a rotation of a motor in a disk drive including a spindle motor rotating a disk and a motor driver operating the spindle motor at specific RPM, the apparatus including: an RPM detector detecting a rotation speed of the disk rotated by the spindle motor; a driving current detector detecting a driving current applied to the spindle motor; a reference value storage unit storing a predetermined target constant RPM, a predetermined low RPM, and a predetermined reference current value of the disk drive; and a spin-up controller transmitting a signal to the motor driver for spinning up the disk to the predetermined target constant RPM, transmitting a signal to the motor driver for rotating the disk at the predetermined low RPM by determining that the disk drive is at a low temperature and changing a rotation mode to a low-speed rotation mode if the disk rotation speed detected by the RPM detector is less than the predetermined target constant RPM, and transmitting a signal to the motor driver for spinning up the disk to the target constant RPM by determining that the temperature of the disk drive has increased and changing the rotation mode to a high-speed rotation mode if the driving current detected by the driving current detector decreases below the predetermined reference current value while the disk is rotating at the low RPM.

According to another aspect fo the present invention, there is provided a method of controlling a rotation of a disk in a drive, the method including: determining whether a fluid dynamic bearing (FDB) viscosity exceeds a threshold level, the threshold level based on a FDB viscosity at a normal operating temperature and at a temperature below the normal operating temperature; pre-heating the drive by rotating the disk at a low rotation speed in a low-rotation speed mode, when the FDB viscosity exceeds the threshold level; determining, during the pre-heating, whether a driving current supplied to a spindle motor rotating the disk is less than a reference current value; and increasing the rotation speed of the disk to a target rotation speed by changing to a high-rotation speed mode, when the driving current is less than the reference current value.

According to another aspect of the present invention, there is provided a hard disk drive, including: an RPM detector detecting a rotation speed of a disk rotated by a spindle motor; a driving current detector detecting a driving current applied to the spindle motor; a reference value storage unit storing a target constant RPM, a low RPM, and a reference current value of the disk drive; and a spin-up controller transmitting a signal to the motor driver for spinning up the disk to the predetermined target constant RPM, transmitting a signal to the motor driver for rotating the disk at the predetermined low RPM when determining that the disk drive operates at a low temperature and changing a rotation mode to a low-speed rotation mode when the disk rotation speed detected by the RPM detector is less than the predetermined target constant RPM, and transmitting a signal to the motor driver for spinning up the disk to the target constant RPM to the motor driver when determining that the temperature of the disk drive has increased and changing the rotation mode to a high-speed rotation mode when the driving current detected by the driving current detector decreases below the predetermined reference current value while the disk is rotating at the low RPM.

According to another aspect of the present invention, there are provided computer readable recording media encoded with processing instructions for causing a processor to execute the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
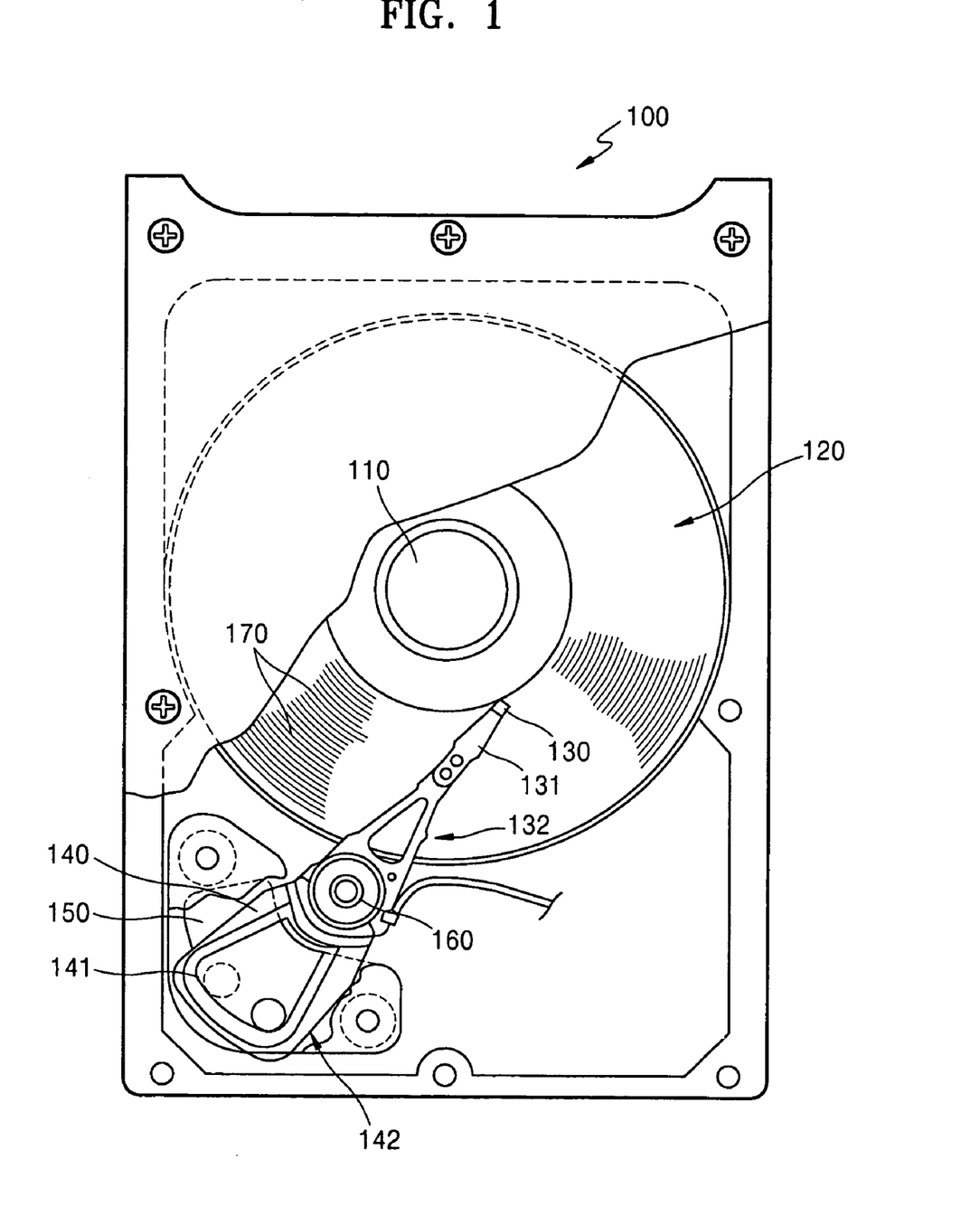
FIG. 1 illustrates a configuration of an HDD to which embodiments of the present invention are applicable.

FIG. 1 illustrates a configuration of an HDD 100 to which embodiments of the present invention are applicable.

Referring to FIG. 1, the HDD 100 includes at least one magnetic disk 120 rotated by a spindle motor 110. The HDD 100 also includes a head 130 adjacently located to the surface of the disk 120.

The head 130 can read or write information from or on the rotating disk 120 by sensing a magnetic field formed on the disk 120 or magnetizing the disk 120. Typically, the head 130 approaches each disk surface. Though a single head 130 is shown in FIG. 1, the head 130 includes a write head for magnetizing the disk 120 and a separated read head for sensing a magnetic field of the disk 120. The read head includes a magneto-resistive (MR) component.

The head 130 is assembled on a slider 131. The slider 131 generates an air bearing between the head 130 and the surface of the disk 120. The slider 131 is combined with a head gimbal assembly (HGA) 132. The HGA 132 is attached to an actuator arm 140 having a voice coil 141. The voice coil 141 is located adjacently to a magnetic assembly 150 of a voice coil motor (VCM) 142. A current supplied to the voice coil 141 generates a torque which rotates the actuator arm 140 around a bearing assembly 160. The rotation of the actuator arm 140 moves the head 130 across the surface of the disk 120.

Information is typically stored in concentric tracks of the disk 120. In general, each track 170 includes a plurality of sectors. Each sector includes a data field and an identification field. The identification field is composed of a gray code for identifying sectors and tracks (cylinders). The head 130 moves across the surface of the disk 120 to read or write information from or on other track.

Figure 2:
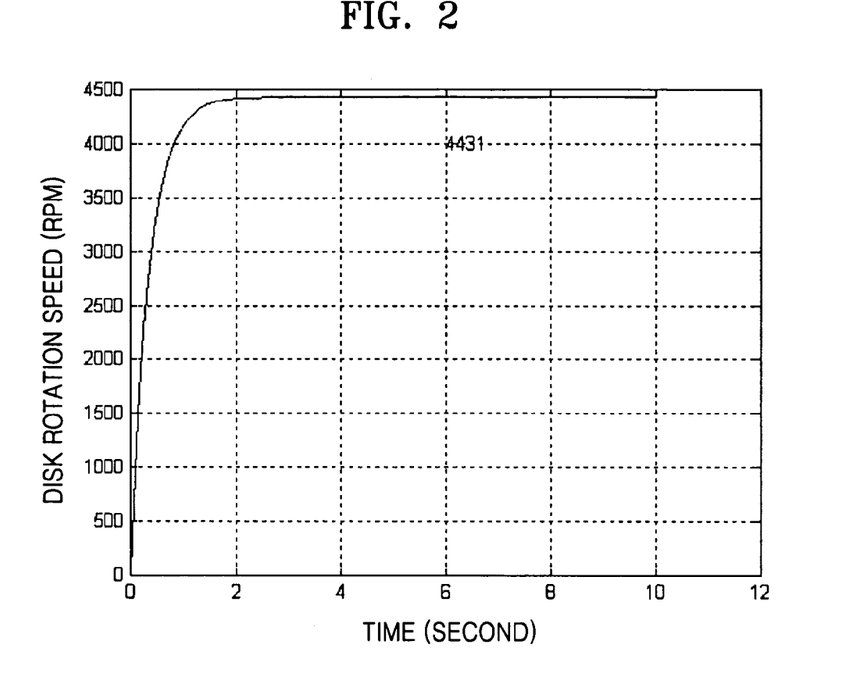
FIG. 2 illustrates a graph of an attainable disk rotation speed of an HDD at a low temperature.

FIG. 2 illustrates a graph of an attainable disk rotation speed of an HDD at a low temperature.

As illustrated in FIG. 2, if the disk rotation speed is increased when the HDD is at a low temperature of −30° C., the speed reaches a maximum value of 4400 RPM after 4 seconds.

Figure 3:
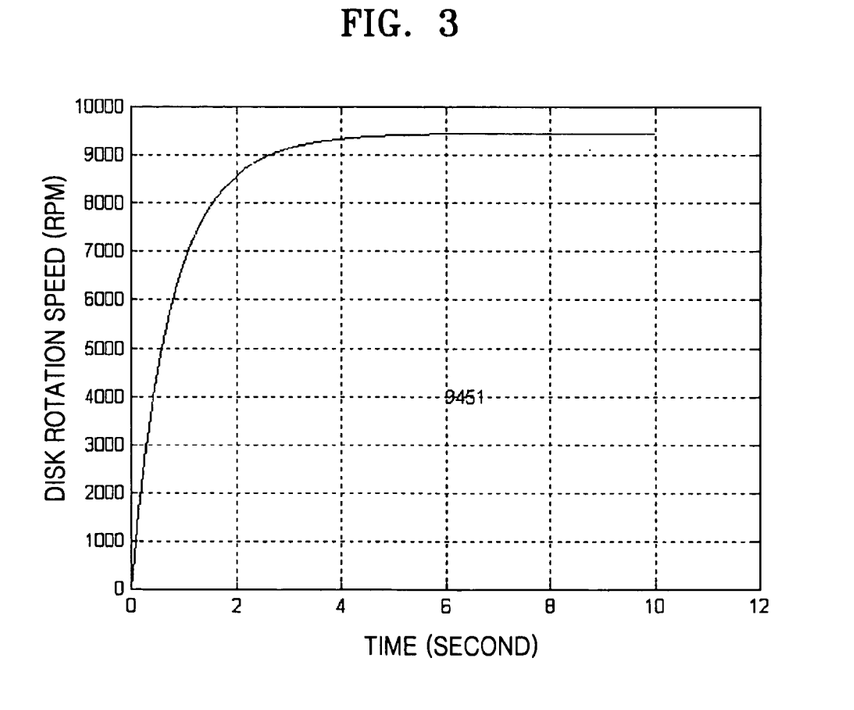
FIG. 3 illustrates a graph of an attainable disk rotation speed of an HDD at a normal temperature.

FIG. 3 illustrates a graph of an attainable disk rotation speed of an HDD at a normal temperature.

As illustrated in FIG. 3, if the disk rotation speed is increased when the HDD is at a normal temperature of 25° C., the speed reaches a maximum value of 9300 RPM after 5 seconds.

Figure 4:
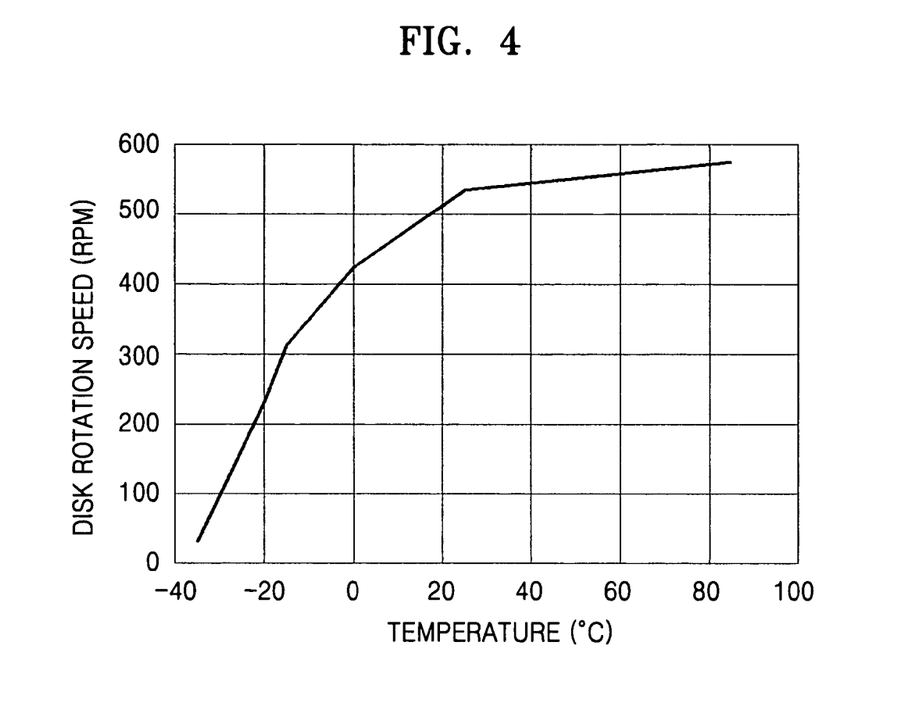
FIG. 4 illustrates a graph of the maximum attainable disk rotation speed of an HDD based on a temperature.

FIG. 4 illustrates a graph of the temperature dependence of the maximum attainable disk rotation speed of an HDD.

As illustrated in FIG. 4, the maximum attainable disk rotation speed largely varies before and after a temperature of the HDD reaches 0° C. This is because a viscous power of a fluid bearing rapidly increases if the temperature of the HDD decreases below 0° C., thereby obstructing the rotation of a disk. If design parameters of the HDD, such as a voltage of a motor installed in the HDD, a torque constant, a resistance, and FDB oil, have been determined as illustrated in FIGS. 2 and 3, the disk can rotate at maximum 9300 RPM at 25° C. and at maximum 4400 RPM at −30° C.

If the target RPM set in an HDD design stage in advance is 5400 RPM, since the maximum attainable disk rotation speed at −30° C. is 4400 RPM, the spin-up process cannot be normally performed.

Figure 5:
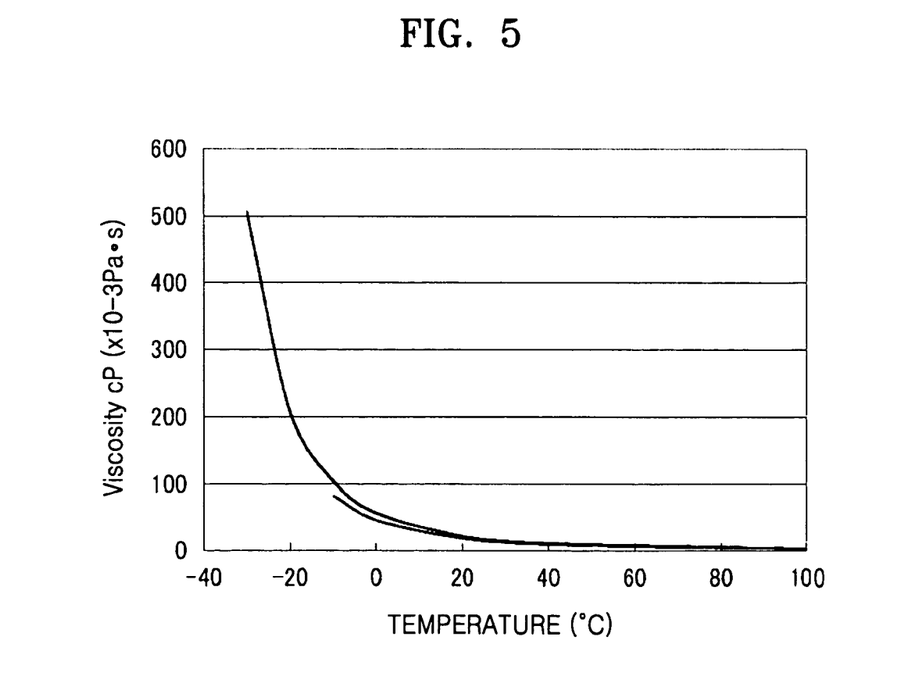
FIG. 5 illustrates a graph of a temperature characteristic of FDB viscosity of a spindle motor.

FIG. 5 illustrates a graph showing the temperature dependence of FDB viscosity of a spindle motor.

FIG. 5 explains the variations of disk rotation speeds shown in FIGS. 2, 3, and 4. That is, while the FDB viscosity varies very little when the temperature of the HDD is equal to or greater than 0° C., the FDB viscosity rapidly increases when the temperature of the HDD decreases below 0° C. Accordingly, the maximum rotation speed that can be reached by the spindle motor is limited at a low temperature.

Figure 6:
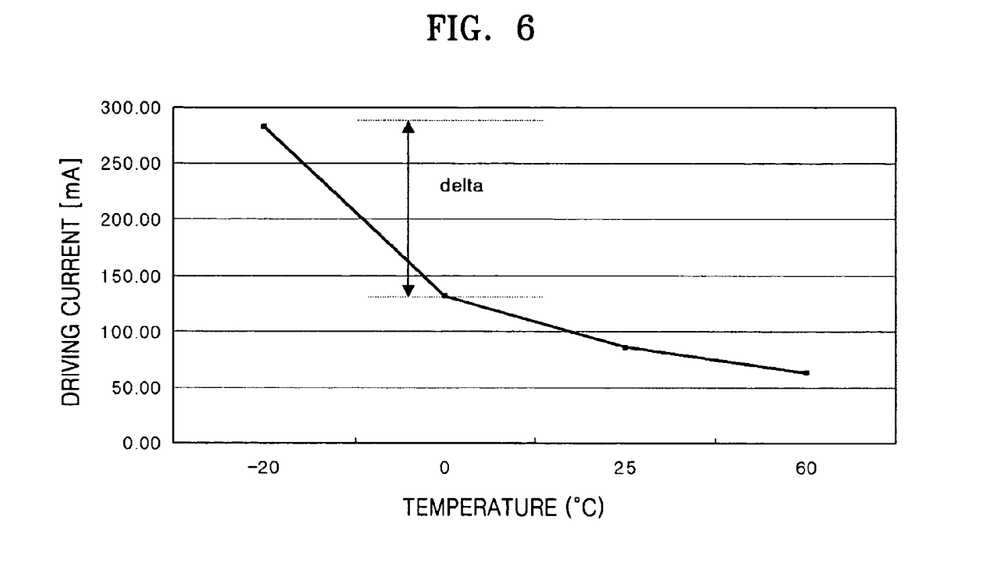
FIG. 6 illustrates a graph showing a correlation between a driving current applied to a spindle motor and a temperature of the spindle motor.

FIG. 6 illustrates a graph showing a correlation between a driving current applied to a spindle motor and a temperature of the spindle motor.

Because of an increase of FDB viscosity due to a decrease of a temperature of an HDD, a higher driving current is required for the spindle motor to rotate a disk at the same RPM like at a normal temperature. In FIG. 6, while a driving current of 280 mA at −20° C. is required to rotate the disk at the same RPM, a driving current of 130 mA at 0° C. is required to rotate the disk at the same RPM. If the driving current decreases from 280 mA to 130 mA while the disk is rotating at 4400 RPM at −20° C., the temperature of the HDD has increased to 0° C.

In addition, when a variation amount of the driving current corresponding to the temperature of the HDD is more than a predetermined reference value, the HDD may be configured to spin up or down the disk.

Using this, a temperature variation of the HDD can be known without complicated calculations of estimating the maximum attainable RPM of the HDD by directly measuring the temperature of the HDD, and then it can be determined whether the disk is spun up to a higher RPM.

Figure 7:
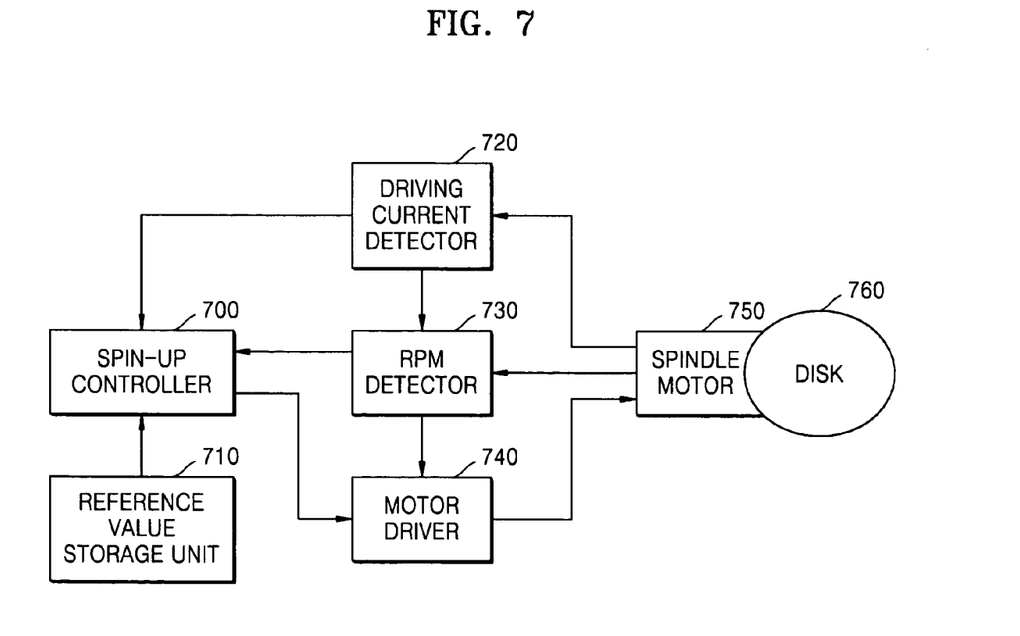
FIG. 7 is a block diagram of an apparatus for controlling the rotation of a motor in a disk drive according to an embodiment of the present invention.

FIG. 7 is a block diagram of an apparatus for controlling a rotation of a motor of a disk drive according to an embodiment of the present invention.

Referring to FIG. 7, a spin-up controller 700 transmits a signal for spinning up a disk 760 to predetermined target constant RPM to a motor driver 740 when the disk drive is powered on.

The spin-up controller 700 also transmits a signal for rotating the disk 760 at the predetermined low RPM to the motor driver 740 when determining that the disk drive is at a low temperature and changing a rotation mode to a low-speed rotation mode if a disk rotation speed detected by an RPM detector 730 is less than the predetermined target constant RPM.

The spin-up controller 700 also transmits a signal for spinning up the disk 760 to the target constant RPM to the motor driver 740 when determining that a temperature of the disk drive has increased and changing the rotation mode to a high-speed rotation mode if a driving current detected by a driving current detector 720 decreases below a predetermined reference current value while the disk 760 is rotating at the predetermined low RPM.

A reference value storage unit 710 stores the predetermined target constant RPM, the predetermined low RPM, and the predetermined reference current value set in advance in a design stage and transmits the stored predetermined target constant RPM, predetermined low RPM, and predetermined reference current value to the spin-up controller 700.

The driving current detector 720 detects the driving current applied to a spindle motor 750.

The RPM detector 730 detects a rotation speed of the disk 760 rotated by the spindle motor 750.

The motor driver 740 receives a signal containing specific RPM information from the spin-up controller 700 and operates the spindle motor 750 at the specific RPM by applying a driving current corresponding to the specific RPM to the spindle motor 750.

The spindle motor 750 connected to a disk axis of the disk drive rotates the disk 760 at the specific RPM according to the driving current applied by the motor driver 740.

Here, since the present embodiment does not include a read/write timing control according to an RPM variation during an operation of the disk drive for the simplification of the design, to change the target RPM, all settings are initialized after spin-down, the target RPM is changed to another RPM value, and spin-up is performed with the changed RPM. That is, in the present embodiment, a process of changing the rotation mode to the low-speed rotation mode or the high-speed rotation mode includes processes of spinning down the disk, changing the target RPM, and spinning up the disk.

Figure 8:
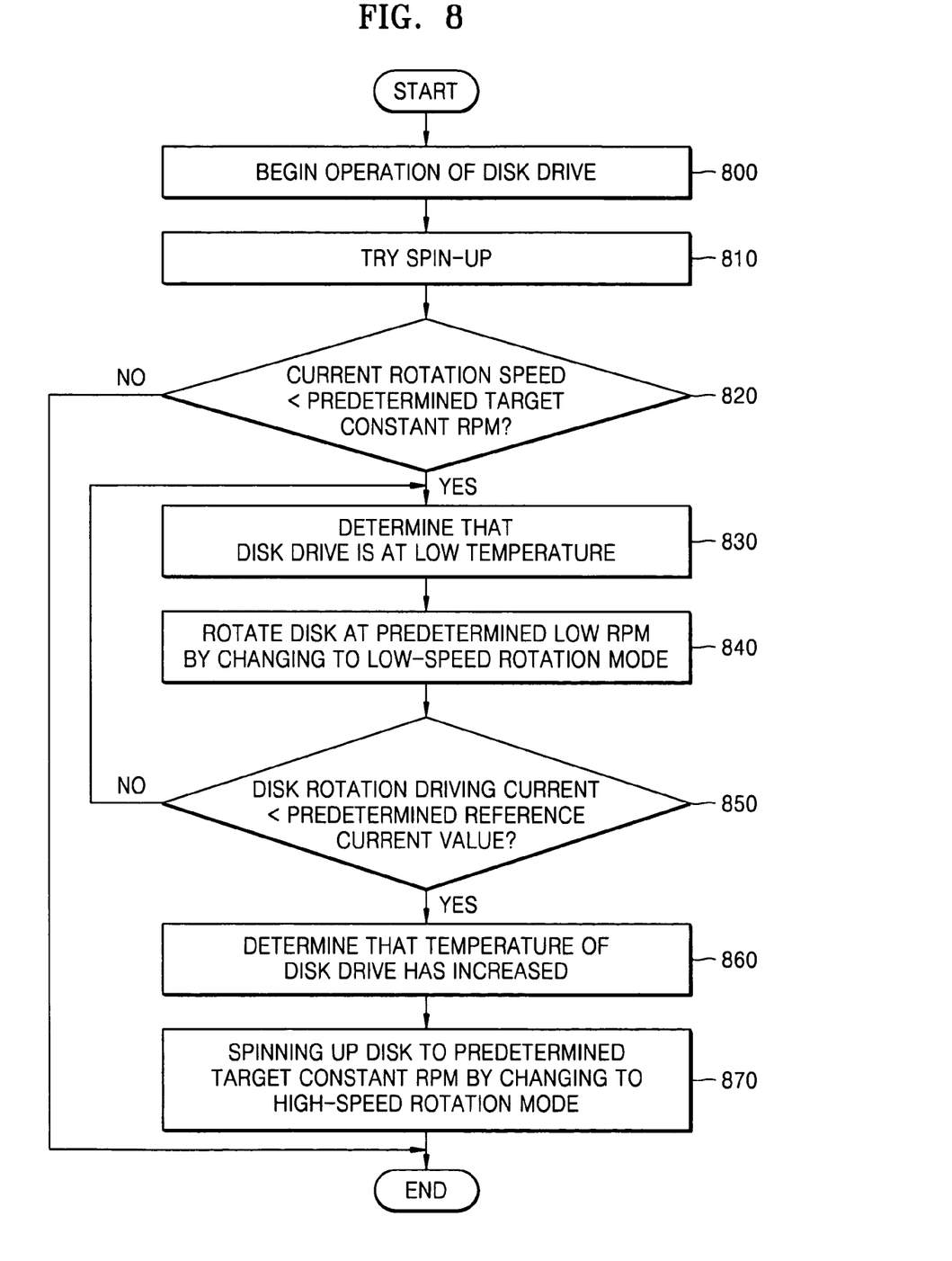
FIG. 8 is a flowchart of a method of controlling the rotation of a motor in a disk drive according to an embodiment of the present invention.

FIG. 8 is a flowchart of a method of controlling a rotation of a motor of a disk drive according to an embodiment of the present invention.

Referring to FIG. 8, the disk drive is turned on in operation 800. Although in the present embodiment a spin-up and a change to a low-speed rotation mode are performed when the disk drive is turned on, it is to be understood that the spin-up and change to a low-speed rotation mode can be performed when an ambient temperature of the disk drive rapidly varies when the disk drive is operating.

When the disk drive is turned on, spin-up is tried in operation 810. The spin-up indicates a process of increasing a disk rotation speed to a predetermined target RPM.

After the spin-up, it is determined in operation 820 whether a current disk rotation speed is less than predetermined target constant RPM. Here, the predetermined target constant RPM is a rotation speed determined by a designer to maintain the disk drive in a normal operation.

If the current disk rotation speed is equal to or greater than the predetermined target constant RPM, it is determined that the ambient temperature is not a very low temperature, and the disk drive can begin the normal operation, and thus a pre-heating process described below is unnecessary. Accordingly, the method ends.

Conversely, if the current disk rotation speed is less than the predetermined target constant RPM, it is determined in operation 830 that the disk drive is at a low temperature. That is, it is determined that FDB viscosity has significantly increased compared to that at a normal temperature.

When it is determined that the disk drive is at a low temperature, a disk rotates at predetermined low RPM by being changed to a low-speed rotation mode in operation 840. Here, the predetermined low RPM can be determined to the lowest rotation speed at which a head of the disk drive can be normally raised from the surface of the disk. At present, according to the technology level in the art, the head can be normally raised only if the disk rotates at a minimum of 3600 RPM.

While the disk is rotating at the predetermined low RPM, it is determined in operation 850 whether a driving current for the disk rotation is less than a predetermined reference current value. Here, the predetermined reference current value is a current amount by which a maximum attainable RPM of the disk drive at a temperature corresponding to the predetermined reference current value can exceed the predetermined target constant RPM and can be defined as a parameter determined in advance.

If the driving current for the disk rotation is equal to or greater than the predetermined reference current value, it is determined that the disk drive is still at a low temperature, and this process goes back to operation 830.

If the driving current for the disk rotation is less than the predetermined reference current value, it is determined in operation 860 that the temperature of the disk drive has increased.

When it is determined that the temperature of the disk drive has increased, the disk is spun up to the predetermined target constant RPM by being changed to a high-speed rotation mode in operation 870.

Figure 9:
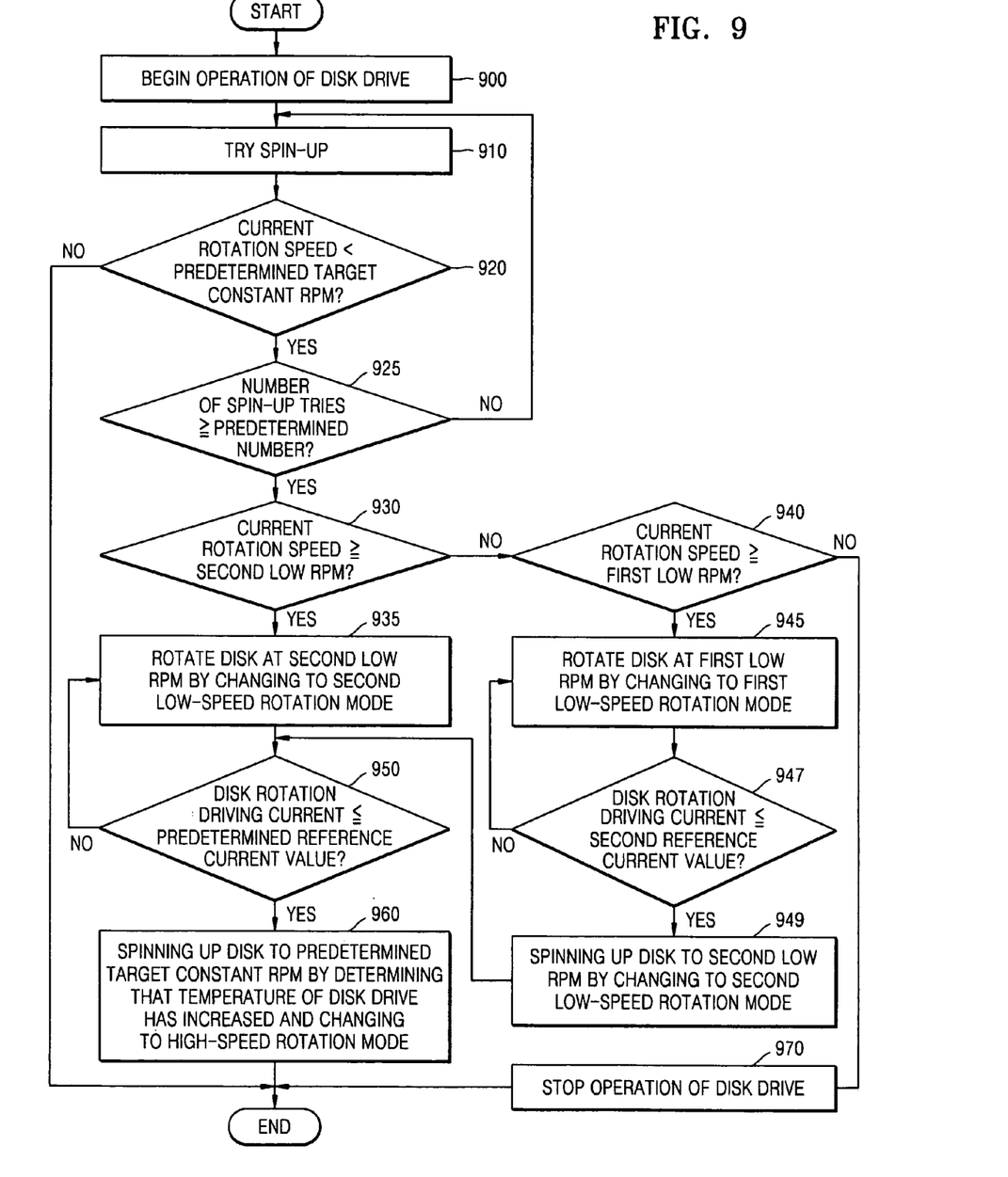
FIG. 9 is a flowchart of a method of controlling the rotation of a motor in a disk drive according to another embodiment of the present invention.

FIG. 9 is a flowchart of a method of controlling a rotation of a motor in a disk drive according to another embodiment of the present invention.

Referring to FIG. 9, the disk drive is turned on in operation 900. Although in the present embodiment a spin-up and a change to a low-speed rotation mode are performed when the disk drive is turned on, the spin-up and change to a low-speed rotation mode can be performed when an ambient temperature of the disk drive rapidly varies when the disk drive is operating.

When the disk drive is turned on, spin-up is tried in operation 910. The spin-up indicates a process of increasing a disk rotation speed to a predetermined target RPM.

After the spin-up, it is determined in operation 920 whether a current disk rotation speed is less than predetermined target constant RPM. Here, the predetermined target constant RPM is a rotation speed determined by a designer to maintain the disk drive in a normal operation.

If the current disk rotation speed is equal to or greater than the predetermined target constant RPM, it is determined that the ambient temperature is not a very low temperature, and the disk drive can begin the normal operation, and thus a pre-heating process described below is unnecessary. Accordingly, all procedures end.

Conversely, if the current disk rotation speed is less than the predetermined target constant RPM, it is determined in operation 925 whether the number of spin-up tries is equal to or greater than a predetermined number.

Here, the predetermined number can be set by a designer according to an intended application. If the predetermined number is too big, the disk drive may not normally operate at a very low temperature. Conversely, if the predetermined number is too small, the disk drive operates at the low RPM even if the ambient temperature temporarily decreases, and therefore, the performance of the disk drive cannot be guaranteed. The predetermined number may be 3.

If the current disk rotation speed can reach the predetermined target constant RPM in several spin-up processes (less than the predetermined number), the pre-heating process described below is unnecessary. Thus, if the number of spin-up tries is less than the predetermined number, this process goes back to operation 910, and the spin-up is tried again.

If the number of spin-up tries is equal to or greater than the predetermined number, it is determined in operation 930 whether the current disk rotation speed is equal to or greater than second low RPM.

If the current disk rotation speed is equal to or greater than the second low RPM, the disk is rotated at the second low RPM by being changed to a second low-speed rotation mode in operation 935.

If the current disk rotation speed is less than the second low RPM, it is determined in operation 940 whether the current disk rotation speed is equal to or greater than first low RPM. If the current disk rotation speed is less than the first low RPM, the disk drive stops operating in operation 970, and all procedures end. If the current disk rotation speed is equal to or greater than the first low RPM, the disk is rotated at the first low RPM by being changed to a first low-speed rotation mode in operation 945. It is determined in operation 947 whether a driving current for the disk rotation applied to a spindle motor is equal to or less than a second reference current value while the disk is rotating at the first low RPM. The second reference current value is a current amount corresponding to a threshold temperature at which the spindle motor can maintain the second low RPM. That is, if the driving current of the spindle motor is equal to or less than the second reference current value due to an increase of the temperature of the disk drive, the maximum RPM of the spindle motor at the moment can be greater than the second low RPM.

If the driving current for the disk rotation is greater than the second reference current value in operation 947, this process goes back to operation 945, and the disk rotation speed is maintained at the first low RPM. If the driving current for the disk rotation is equal to or less than the second reference current value in operation 947, the disk is spun up to the second low RPM by being changed to the second low-speed rotation mode in operation 949.

When the disk starts to rotate at the second low RPM according to any of the both cases where the disk rotates at the second low RPM from the first and where the disk is spun up from the first low RPM to the second low RPM, it is determined in operation 950 whether the disk rotation driving current of the spindle motor is equal to or less than a predetermined reference current value. If the disk rotation driving current is greater than the predetermined reference current value, this process goes back to operation 935, and the disk rotation speed is maintained at the second low RPM.

If the disk rotation driving current is equal to or less than the predetermined reference current value, in operation 960, it is determined that the temperature of the disk drive has increased, and the disk is spun up to the predetermined target constant RPM by being changed to a high-speed rotation mode.

Through the above-described process, the disk is rotated at the RPM that the designer of the disk drive has targeted, and therefore, the disk drive can normally operate and the performance of the disk drive can be guaranteed.

Figure 10:
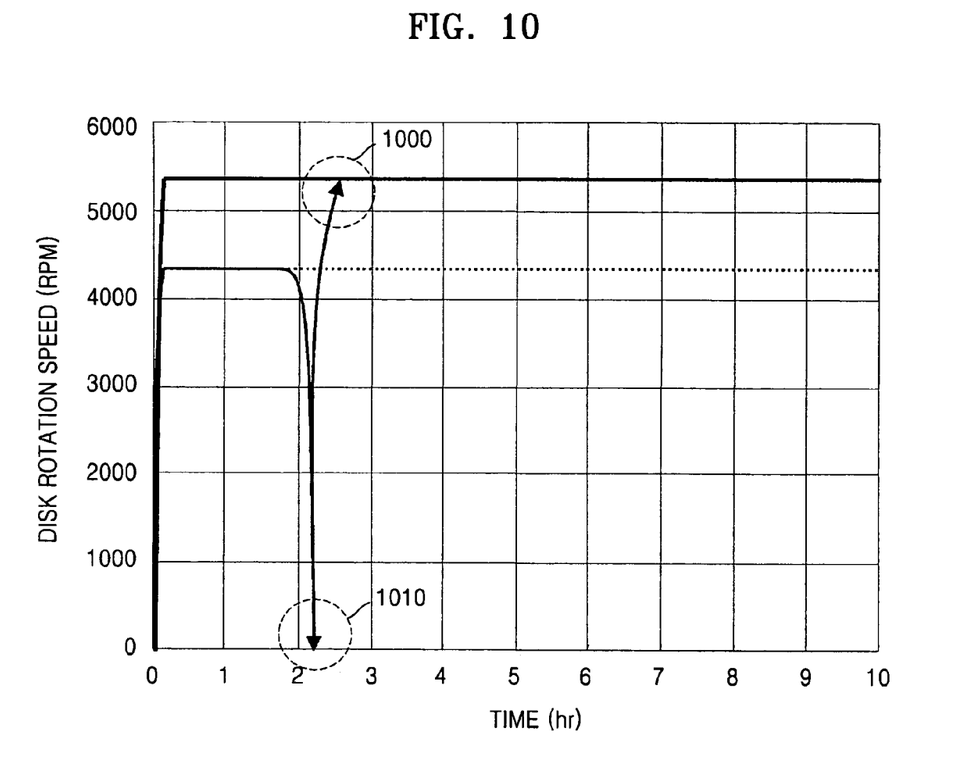
FIG. 10 illustrates a graph of RPM versus time in the case where a target constant RPM is 5400 RPM according to an embodiment of the present invention.

FIG. 10 illustrates a graph of RPM versus time in the case where a target constant RPM is 5400 RPM according to an embodiment of the present invention.

FIG. 10 shows a variation of a disk rotation speed (RPM) according to time. Although the disk rotation speed can reach the target constant RPM, i.e., 5400 RPM when first spin-up is performed, the disk rotation speed can reach up to maximum 4400 RPM at a very low temperature of −30° C. When a disk rotates at 4400 RPM, a head can be sufficiently raised from the surface of the disk. Thus, a disk drive keeps rotating the disk at 4400 RPM and does not perform spin-up to 5400 RPM. If a driving current of a spindle motor decreases below a reference value after 1 hour and 40 minutes from the time when the disk rotates at 4400 RPM, the disk drive tries spin-up to the target constant RPM, i.e., 5400 RPM at the time corresponding to reference numeral 1000. However, if it is difficult to maintain 4400 RPM due to a decrease of the temperature of the disk drive, the disk drive stops operating at the time corresponding to reference numeral 1010.

Here, since the present embodiment does not include a read/write timing control according to an RPM variation during an operation of the disk drive for the simplification of the design, to change a target RPM, all settings are initialized after spin-down, the target RPM is changed to another RPM value, and spin-up is performed with the changed RPM. In FIG. 10, a process in which the disk rotation speed rapidly decreases when the disk rotation speed is changed is shown.

A program for executing a method of controlling the rotation of a motor in a disk drive may be recorded in a computer readable recording medium.

Also, embodiments of the present invention can be realized as software. When realized as software, components of embodiments of the present invention are embodied as code segments for executing required operations stored in a processor readable recording medium.

According to the above-described embodiments of the present invention, whether a disk drive operates at a very low temperature can be easily detected using a driving current without a temperature sensor, and spin-up can be normally performed through a step-by-step spin-up process. Therefore, a normal operation and reliability of the disk drive can be guaranteed, an excessive driving current for the normal operation of the disk drive is not required at the very low temperature, and an RPM mode change according to variations of an ambient temperature can be performed at low cost without a drastic design change of the disk drive.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of controlling a rotation of a motor in a disk drive, the method comprising:
    performing spin-up when the disk drive is operating and determining whether a disk rotation speed is less than a predetermined target constant revolutions per minute (RPM);
    rotating a disk at a predetermined low RPM when determining whether the disk drive operates at a low temperature and changing a rotation mode to a low-speed rotation mode when it is determined that the disk rotation speed is less than the predetermined target constant RPM; and
    spinning up the disk to the target constant RPM when determining whether the temperature of the disk drive has increased and changing the rotation mode to a high-speed rotation mode when a disk rotation driving current decreases below a predetermined reference current value while the disk is rotating at the low RPM.

2. The method of claim 1, wherein, in the determination whether a disk rotation speed is less than a predetermined target constant RPM, when an operation of the disk drive is initialized, a process of trying the spin-up and determining whether the disk rotation speed is less than the predetermined target constant RPM is performed a predetermined number of times.

3. The method of claim 2, wherein the predetermined number of times is at least equal to 3.

4. The method of claim 1, wherein the determination whether a disk rotation speed is less than a predetermined target constant RPM further comprises:
    stopping an operation of the disk drive when determining that the disk drive cannot be operated when the disk rotation speed is less than first low RPM,
    wherein the predetermined low RPM is the first low RPM which is the minimum rotation speed at which a head of the disk drive can be normally raised from the surface of the disk.

5. The method of claim 1, wherein the rotation of the disk at the predetermined low RPM comprises:
    rotating the disk at second low RPM by changing the rotation mode to a second low-speed rotation mode when the disk rotation speed is less than the predetermined target constant RPM and at least equal to the second low RPM; and
    rotating the disk at first low RPM by changing the rotation mode to a first low-speed rotation mode when the disk rotation speed is less than the second low RPM and is at least equal to the first low RPM,
    wherein the predetermined low RPM is divided into the first low RPM and the second low RPM which is faster than the first low RPM.

6. The method of claim 5, wherein, in the rotation of the disk at first the low RPM, the disk is spun up to the second low RPM by determining that the temperature of the disk drive has increased and changing the rotation mode to the second low-speed rotation mode when the disk rotation driving current decreases below a predetermined second reference current value while the disk is rotating at the first low RPM.

7. The method of claim 1, wherein the predetermined low RPM is the minimum rotation speed at which a head of the disk drive can be normally raised from the surface of the disk.

8. An apparatus for controlling a rotation of a motor in a disk drive comprising a spindle motor rotating a disk and a motor driver operating the spindle motor at specific revolutions per minute (RPM), the apparatus comprising:
    an RPM detector detecting a rotation speed of the disk rotated by the spindle motor;
    a driving current detector detecting a driving current applied to the spindle motor;
    a reference value storage unit storing a predetermined target constant RPM, a predetermined low RPM, and a predetermined reference current value of the disk drive; and
    a spin-up controller transmitting a signal to the motor driver for spinning up the disk to the predetermined target constant RPM, transmitting a signal to the motor driver for rotating the disk at the predetermined low RPM when determining that the disk drive operates at a low temperature and changing a rotation mode to a low-speed rotation mode when the disk rotation speed detected by the RPM detector is less than the predetermined target constant RPM, and transmitting a signal to the motor driver for spinning up the disk to the target constant RPM to the motor driver when determining that the temperature of the disk drive has increased and changing the rotation mode to a high-speed rotation mode when the driving current detected by the driving current detector decreases below the predetermined reference current value while the disk is rotating at the low RPM.

9. The apparatus of claim 8, wherein the spin-up controller performs, a predetermined number of times, a process of transmitting a signal for spinning up the disk to the target constant RPM to the motor driver and determining whether the disk rotation speed detected by the RPM detector is less than the predetermined target constant RPM when an operation of the disk drive is initialized.

10. The apparatus of claim 9, wherein the predetermined number of times is at least equal to 3.

11. The apparatus of claim 8, wherein the reference value storage unit stores a first low RPM which is the minimum rotation speed at which a head of the disk drive can be normally raised from the surface of the disk, and
    the spin-up controller transmits a signal to the motor driver for stopping an operation of the spindle motor when determining that the disk drive cannot be operated when the disk rotation speed detected by the RPM detector is less than the first low RPM.

12. The apparatus of claim 8, wherein the reference value storage unit stores a first low RPM and a second low RPM, which is faster than the first low RPM, for the predetermined low RPM, and
    the spin-up controller transmits a signal to the motor driver for rotating the disk at the second low RPM by changing the rotation mode to a second low-speed rotation mode when the disk rotation speed detected by the RPM detector is less than the predetermined target constant RPM and at least equal to the second low RPM, and transmits a signal to the motor driver for rotating the disk at the first low RPM by changing the rotation mode to a first low-speed rotation mode when the disk rotation speed detected by the RPM detector is less than the second low RPM and at least equal to the first low RPM.

13. The apparatus of claim 12, wherein the spin-up controller transmits a signal to the motor driver for spinning up the disk to the second low RPM when determining that the temperature of the disk drive has increased and changing the rotation mode to the second low-speed rotation mode when the driving current detected by the driving current detector decreases below a predetermined second reference current value while the disk is rotating at the first low RPM.

14. The apparatus of claim 8, wherein the predetermined low RPM is the minimum rotation speed at which a head of the disk drive can be normally raised from the surface of the disk.

15. A hard disk drive, comprising:
- an RPM detector detecting a rotation speed of a disk rotated by a spindle motor;
- a driving current detector detecting a driving current applied to the spindle motor;
- a reference value storage unit storing a target constant RPM, a low RPM, and a reference current value of the disk drive; and
- a spin-up controller transmitting a signal to the motor driver for spinning up the disk to the predetermined target constant RPM, transmitting a signal to the motor driver for rotating the disk at the predetermined low RPM when determining that the disk drive operates at a low temperature and changing a rotation mode to a low-speed rotation mode when the disk rotation speed detected by the RPM detector is less than the predetermined target constant RPM, and transmitting a signal to the motor driver for spinning up the disk to the target constant RPM to the motor driver when determining that the temperature of the disk drive has increased and changing the rotation mode to a high-speed rotation mode when the driving current detected by the driving current detector decreases below the predetermined reference current value while the disk is rotating at the low RPM.

16. A computer readable recording medium encoded with processing instructions for causing a processor to execute a method of controlling a rotation of a motor in a disk drive, the method comprising:
- performing spin-up when the disk drive is operating and determining whether a disk rotation speed is less than a predetermined target constant revolutions per minute (RPM);
- rotating a disk at a predetermined low RPM when determining whether the disk drive operates at a low temperature and changing a rotation mode to a low-speed rotation mode when it is determined that the disk rotation speed is less than the predetermined target constant RPM; and
- spinning up the disk to the target constant RPM when determining whether the temperature of the disk drive has increased and changing the rotation mode to a high-speed rotation mode when a disk rotation driving current decreases below a predetermined reference current value while the disk is rotating at the low RPM.

* * * * *